United States Patent [19]
Tershak et al.

[11] Patent Number: 4,566,285
[45] Date of Patent: Jan. 28, 1986

[54] REFRIGERATOR DOOR AJAR ALARM WITH VARIABLE DELAY

[75] Inventors: Andrew T. Tershak, Center Township, Vanderburgh County, Ind.; Michael D. Thieneman, Lincoln Township, Berrien County, Mich.

[73] Assignee: Whirlpool Corporation, Benton Harbor, Mich.

[21] Appl. No.: 574,135

[22] Filed: Jan. 26, 1984

[51] Int. Cl.[4] .................... G01K 13/00; F25B 49/00
[52] U.S. Cl. .................................... 62/129; 62/128; 62/131; 62/231; 340/522; 340/527; 340/585
[58] Field of Search ............... 340/585, 545, 527, 522, 340/309.15, 286 R, 286 M; 200/61.62; 62/125, 127, 129, 126, 131

[56] References Cited

U.S. PATENT DOCUMENTS

| | | | |
|---|---|---|---|
| 2,455,182 | 11/1948 | LaVallee | 62/131 |
| 3,786,470 | 1/1974 | Greenhill | 340/527 X |
| 4,012,732 | 3/1977 | Herrick | 340/522 |
| 4,017,843 | 4/1977 | Yanagishima | 340/52 R |
| 4,151,522 | 4/1979 | Yamauchi | 340/309.15 X |
| 4,241,337 | 12/1980 | Prada | 340/547 |
| 4,325,223 | 4/1982 | Cantley | 62/127 X |
| 4,358,932 | 11/1982 | Helfrich, Jr. | 62/126 |
| 4,387,578 | 6/1983 | Paddock | 340/518 |
| 4,411,139 | 10/1983 | Bos | 62/126 |
| 4,463,348 | 7/1984 | Sidebottom | 340/585 |
| 4,482,785 | 11/1984 | Finnegan et al. | 340/539 X |
| 4,490,986 | 1/1985 | Paddock | 62/127 |
| 4,503,419 | 3/1985 | Kidd et al. | 340/527 X |
| 4,528,558 | 7/1985 | Steers et al. | 340/686 |

OTHER PUBLICATIONS

"Refrigerator Alarm", Elektor, vol. 2, No. 11, p. 1141, Nov. 1976.

Primary Examiner—James L. Rowland
Assistant Examiner—Thomas J. Mullen, Jr.
Attorney, Agent, or Firm—Wood, Dalton, Phillips, Mason & Rowe

[57] ABSTRACT

A door ajar alarm system for a refrigerator-freezer, the system having a variable alarm delay period. The door ajar alarm system includes a control which may be digital or analog for monitoring various operating conditions of the refrigerator such as the temperatures of the refrigerator compartments and whether the refrigerator is undergoing a defrost operation. The control determines the alarm delay period in accordance with the monitored conditions such that the delay period is decreased in response to each monitored condition which reaches a predetermined status. The door ajar alarm thus alerts the user to operating conditions which are likely to produce an undesirable temperature within the refrigerator more rapidly than usual or to produce temperatures from which recovery is unusually slow.

18 Claims, 5 Drawing Figures

REFRIGERATOR DOOR AJAR ALARM WITH VARIABLE DELAY

FIELD OF THE INVENTION

This invention relates to an improved door ajar alarm for a refrigerator-freezer which aids the user in avoiding temperature conditions within the refrigerator which are deleterious to food storage.

DESCRIPTION OF THE BACKGROUND ART

Refrigerators having fresh food and freezer compartments have been known to include a door ajar alarm system for providing an audible or visual alarm when the door to either of the compartments has been open for a fixed period of time constituting the alarm delay period. By thus alerting the user, undesirable temperature conditions within the compartments may be avoided. It has been found, however, that the effect of an open compartment door on the compartment's temperature varies depending on the operating condition of the refrigerator. Under certain operating conditions the fixed alarm delay period may be too long so that undesirable temperature conditions may not be avoided by alerting the user with known door ajar alarm systems.

One operating condition during which an open compartment door has a great effect on the compartment's temperature is a defrost operation. During a defrost operation, defrost heat is being applied to the evaporator and the compressor cannot be energized to cool warm air which enters the compartment through an open door, so that undesirable temperature conditions are rapidly produced. It is, therefore, desirable to decrease the alarm delay period when the refrigerator is undergoing a defrost operation. Other operating conditions under which an open door rapidly produces undesirable temperatures, or temperature conditions, from which recovery is unusually slow may occur when either the fresh food or freezer compartment is at an abnormally high temperature or when the refrigerator is operating in a special cooling mode, for example, where the compartments are being cooled to the lowest practical temperature. Under such operating conditions the fixed alarm delay period of known systems, though suitable for normal operating conditions, may be too long to readily alert the user that the door should be closed.

SUMMARY OF THE INVENTION

In accordance with the present invention, the disadvantages of prior door ajar alarm systems for refrigerators have been overcome.

The door ajar alarm system of the present invention monitors various operating conditions of the refrigerator and varies the delay period of the door ajar alarm in accordance with the monitored conditions such that the delay is decreased when a door is opened during an operating condition which is likely to produce an undesirable operating temperature within the refrigerator more rapidly than usual or to produce a temperature condition from which recovery will be unusually slow.

The door ajar alarm system includes a plurality of sensors, each coupled to the refrigerator to monitor an operating condition of the refrigerator, such as the temperatures of the refrigerator compartments and whether the refrigerator is undergoing a defrost operation. The system includes a control which is responsive to the sensor outputs to determine the alarm delay period in accordance with the sensed operating conditions. The control monitors the operating conditions as indicated by the sensor outputs and decreases the alarm delay period for every operating condition which reaches a predetermined status.

In one embodiment, the control for the door ajar alarm system is provided by a microprocessor. The microprocessor is responsive to each of the sensors outputs for monitoring the status of the operating conditions of the refrigerator, a status signal, or flag, being provided when a sensed condition reaches a predetermined status. The microprocessor control determines the alarm delay period in response to the status signals to vary the delay period in accordance with the sensed operating conditions of the refrigerator. The microprocessor control establishes a new alarm delay period only when the compartment doors are not opened, the control actuating the alarm once the door has been opened for the delay period determined by the control immediately prior to the opening of the door.

In another embodiment, an analog control is provided for the door ajar alarm system. The analog control is responsive to a compartment door being opened to provide a signal which increases with time when the door is open. A comparator compares the door open signal to a reference signal to trigger an alarm when the door open signal exceeds the reference signal. The reference signal applied to the comparator is varied in response to the status of various operating conditions, as sensed by a plurality of sensors, the reference signal decreasing in response to each sensed operating condition reaching a predetermined status. By decreasing the reference signal, the analog control decreases the delay period since it takes a shorter time for the door open signal to exceed the reference signal and thus trigger the alarm.

DESCRIPTION OF THE PREFERRED EMBODIMENT

Figure 1:
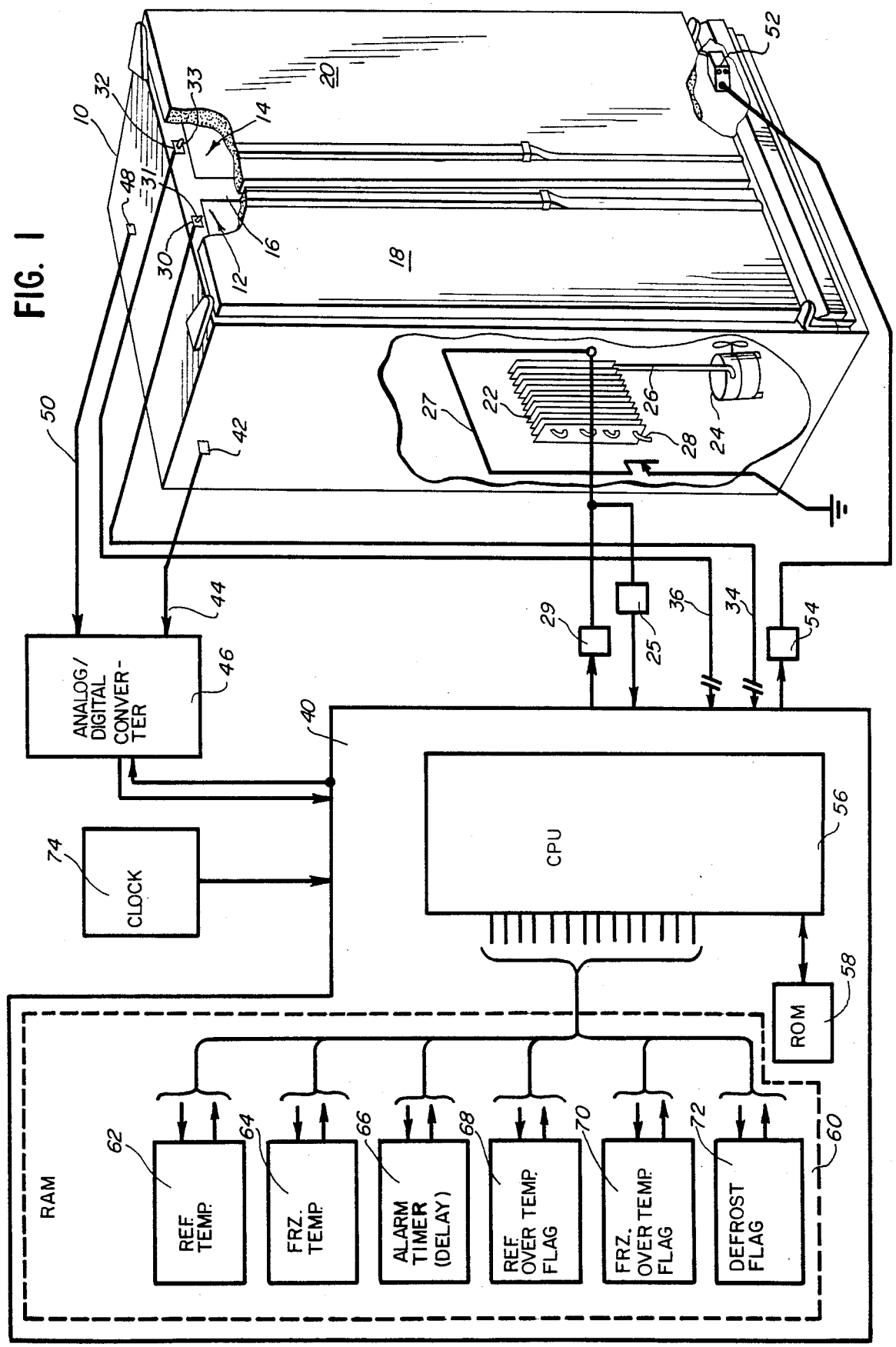
FIG. 1 is a perspective view of a refrigerator and the preferred embodiment of a system for implementing the door ajar alarm control of the present invention.

A door ajar alarm system is shown in FIG. 1 for a refrigerator 10 having a freezer compartment 12 for storing frozen foods and a compartment 14 for storing fresh foods. The freezer compartment 12 is positioned adjacent a side of the fresh food compartment 14 and is insulated therefrom by a partition 16. A freezer door 18 and fresh food door 20 seal off the freezer and fresh food compartments respectively from the outside.

The fresh food and freezer compartments 14 and 12 are cooled by passing refrigerated air into the compartments, the air being refrigerated as a result of being passed in heat exchange relationship with an evaporator coil 22. Refrigerant flows from a compressor 24 and a condenser, not shown, through tubing 26 to an inlet of the evaporator coil 22, the return refrigerant flowing back to the compressor through tubing connected to the outlet 28 of the evaporator coil.

A defrost heater 27 is positioned adjacent to the evaporator coil 22 to defrost the refrigerator. The defrost heater 27 may be a conventional resistive heater energized by means of a relay 29 or the like under the control of a microprocessor 40. Defrost sensing means, such as a relay 25 having its coil (not shown) connected in parallel with the heater 27, are provided to sense whether the defrost heater 27 is on and to provide a signal indicative thereof to the microprocessor control 40.

Conventional control means (not shown) may be used to control the operation of the compressor 24 and the defrost heater 27.

A freezer door switch 30 having a spring loaded actuator 31 is mounted on the refrigerator cabinet 10 so that the actuator 31 is compressed by the freezer door 18 when the door is closed. Similarly, a fresh food door switch 32 having a spring loaded actuator 33 is mounted on the refrigerator cabinet 10 so that the actuator 33 is compressed by the fresh food door 20 when the door is closed. When either of the doors 18 or 20 is opened, the respective actuator 31, 33 moves outwardly, thereby causing the contacts of the associated door switch 30, 32 to close. When the contacts of either of the switches 30, 32 are closed, a signal indicating that the associated refrigerator compartment door is open is provided on respective lines 34, 36 to the microprocessor control 40.

A thermistor 42 positioned within the freezer compartment 12 senses the freezer temperature and provides a signal representative thereof on a line 44 to an analog to digital converter 46. Similarly, a thermistor 48 positioned within the fresh food compartment 14 senses the compartment temperature and provides a signal representative thereof on a line 50 to the analog to digital converter 46. The converter 46 converts the analog signals applied on lines 44 and 50 to digital signals which are compatible with the microprocessor control 40.

The microprocessor control 40 is responsive to the temperature signals from the thermistors 42 and 48 and a signal from the relay 25 indicating that the defrost heater 27 is on, to monitor the operating conditions of the refrigerator 10 and to determine the alarm delay period in accordance therewith. The microprocessor 40 actuates an audible alarm 52 by means of a relay 54 when one or both of the doors has been open for a period of time equal to the determined alarm delay period. The alarm alerts the user that the refrigerator door should be closed to avoid temperature conditions within the refrigerator compartments which are deleterious to food storage. The microprocessor 40 determines the alarm delay period for which one of the doors 18 or 20 is to be opened before actuating the alarm 52, in accordance with the monitored operating conditions of the refrigerator so as to decrease the delay period when a monitored operating condition reaches a predetermined status, as discussed in detail below.

The microprocessor 40 includes a central processing unit or CPU 56 which implements the control logic stored in a read only memory or ROM 58 in accordance with the data stored in a random access memory or RAM 60. The RAM 60 includes a number of registers for storing data input to the microprocessor 40, including a register 62 for storing the sensed refrigerator temperature, a register 64 for storing the sensed freezer temperature, an alarm timer register 66 for storing the alarm delay period as determined by the CPU 56 and registers 68, 70 and 72 for storing respective status signals, or flags, indicating that the refrigerator and/or freezer temperature is greater than a desired temperature and that the defrost heater is on. The microprocessor 40 is also responsive to signals from a clock 74 which provides a reference for measuring real time events.

Figure 2:
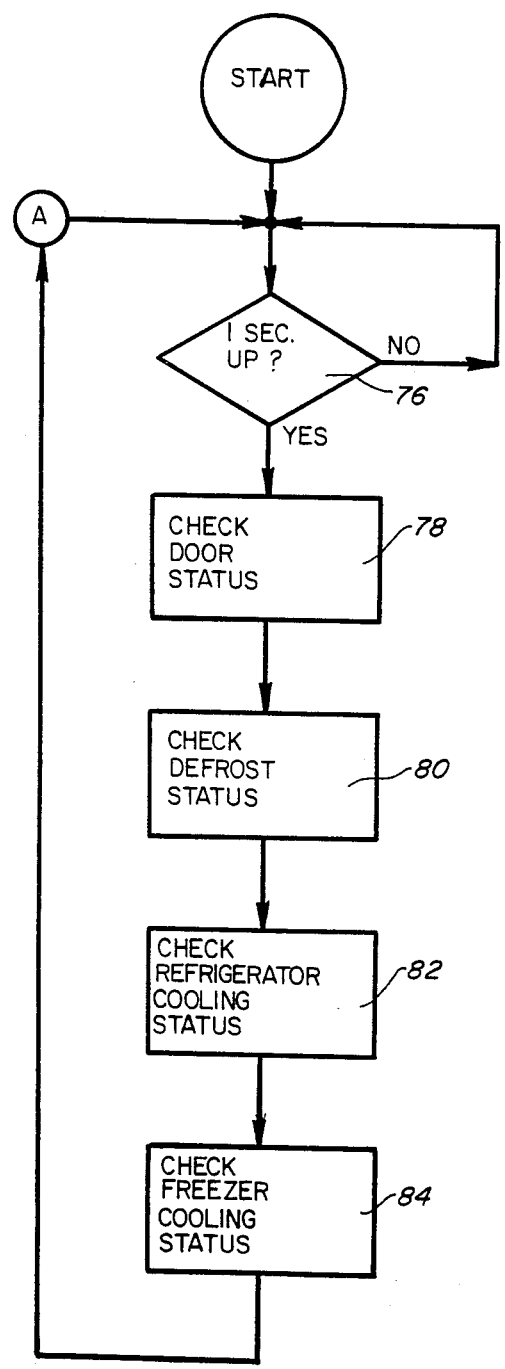
FIG. 2 is a flow chart of the main control program of the present invention.

The flow chart shown in FIG. 2 illustrates the main control program according to which the microprocessor 40 operates to provide the door ajar alarm. At one second time intervals as determined by a block 76, the control 40 checks the status of the doors and the status of the monitored operating conditions of the refrigerator. The status of the freezer door 18 and the fresh food door 20 are checked at a block 78 to determine whether one or both of the doors is open. If neither of the doors is open, the delay period for the door alarm is determined in accordance with the sensed operating conditions of the refrigerator. If one or both of the doors is open, an alarm delay timer is decremented. After checking the door status, the defrost status is checked by a block 80 to determine whether the defrost heater 27 is on or not. The cooling status of the fresh food compartment 14 is then checked by a block 82 after which the status of the freezer cooling is checked by a block 84. After performing the last status check at block 84, the control 40 determines whether the one-second check status time interval has elapsed at block 76, the control waiting until the one-second period has elapsed before performing the next status check.

Figure 3:
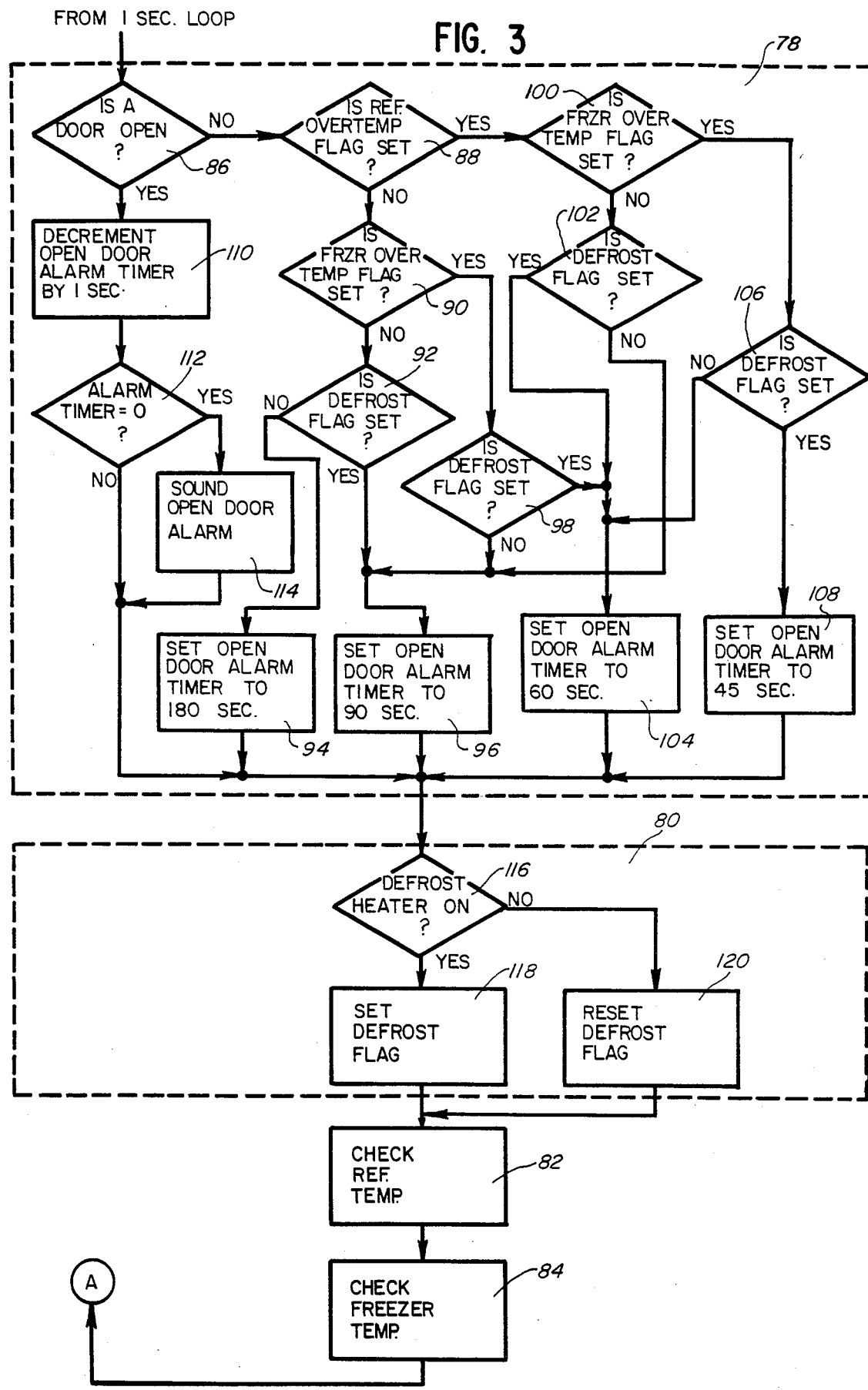
FIG. 3 is a flow chart of a portion of the main control program to check the door status and the defrost status of the refrigerator.

Upon entering the door status check at block 78, as shown in FIG. 3, the control 40 first determines whether one of the doors 18 or 20 is open at a block 86. If neither of the doors is open, the control 40 determines the alarm delay period as follows. At a block 88 an inquiry is made as to whether the refrigerator overtemperature flag is set, indicating that the fresh food compartment temperature is above a predetermined level. If the refrigerator overtemperature flag is not set, an inquiry is made at block 90 to determine whether the freezer overtemperature flag is set, indicating that the freezer is above a predetermined level. If the freezer overtemperature flag is not set, the control 40 at a block 92 determines whether the defrost flag has been set indicating that the defrost heater is on. If it is determined by blocks 88, 90 and 92 that none of the flags have been set, the door alarm timer 66 is set to 180 seconds by a block 94.

If neither the refrigerator overtemperature flag nor the freezer overtemperature flag is set as determined by blocks 88 and 90, but the defrost flag is set as determined by block 92, a block 96 sets the door alarm timer to 90 seconds. If it is determined at block 90 that the freezer overtemperature flag is set but at blocks 88 and 98 it is determined that neither of the refrigerator or defrost flags is set, the door alarm timer is also set to 90 seconds by the block 96. Similarly, if at block 88 it is determined that the refrigerator overtemperature flag is set, but a block 100 determines that the freezer overtemperature flag is not set and a block 102 determines that the defrost flag is not set, the block 96 sets the door alarm timer to 90 seconds.

From the above, it is seen that the delay period for the door alarm timer is decreased from 180 seconds to 90 seconds if one of the monitored operating conditions reaches a predetermined status as indicated by a set flag. That is, the door alarm timer is set to 90 seconds by the block 96 when only one of the flags, the refrigerator overtemperature flag, the freezer overtemperature flag, or the defrost flag, is set.

A block 104 sets the door alarm timer to 60 seconds if it is determined by block 88 that the refrigerator overtemperature flag is not set, but the freezer overtemperature flag and the defrost flag are set, as determined by blocks 90 and 98. The block 104 also sets the door alarm timer to 60 seconds when the block 88 determines that the refrigerator overtemperature flag is set, the block 100 determines that the freezer overtemperature flag is not set, and the block 102 determines that the defrost flag is set. Further, if the refrigerator overtemperature flag is set as determined by block 88, and the freezer overtemperature flag is set as determined by block 100, but the defrost flag is not set as determined by a block 106, the block 104 sets the open door alarm timer to 60 seconds.

It is seen from the above that the delay period for the door alarm timer is further decreased if two monitored operating conditions reach a predetermined status. That is, when the control 40 determines that two of the flags are set, the door alarm timer is set to 60 seconds. If all three flags are set, indicating that the refrigerator compartment is overtemperature as determined by block 88, the freezer compartment is overtemperature as indicated by block 100, and the defrost heater is on as indicated by block 106, a block 108 sets the door alarm timer to 45 seconds to further decrease the delay period.

The delay period for the door alarm timer is set only when neither of the refrigerator compartment doors 18 or 20 is open. If one of the doors is open as determined by block 86, the open door alarm timer as previously set is decremented by one second by a block 110. After decrementing the alarm timer, a block 112 determines whether the alarm timer has been decremented to zero. If the alarm timer has been decremented to zero, a block 114 actuates the audible alarm 52 through the relay 54. If the alarm timer has not been decremented to zero as determined by block 112, the control proceeds to check the defrost status at block 80.

Figure 4:
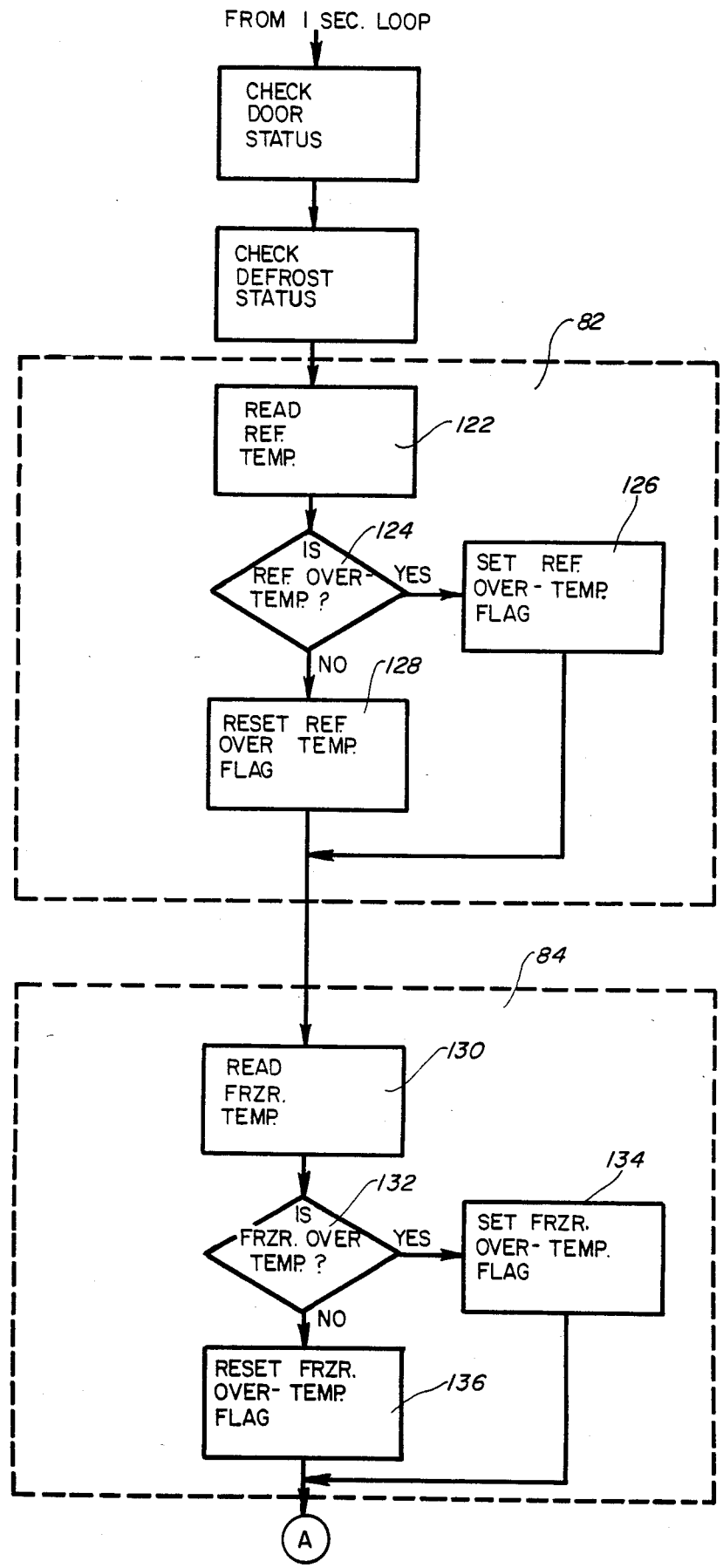
FIG. 4 is a flow chart of a portion of the main control program to check the refrigerator cooling status and the freezer cooling status of the refrigerator.

In checking the status of the defrost at block 80, a block 116 determines whether the defrost heater is on by checking to see whether there is a signal from the relay 25 applied to the microprocessor 40. If the block 116 determines that the defrost heater is on, a defrost flag is set by a block 118. If it is determined that the defrost heater is not on, the defrost flag stored in the register 72 is reset by a block 120. After setting or resetting the defrost flag at blocks 118 or 120, the status of the refrigerator cooling is checked at block 82 as shown in FIG. 4.

In order to monitor the status of the refrigerator cooling at block 82, a block 122 reads the fresh food compartment temperature stored in the register 62 of the RAM 60. A block 124 determines whether the fresh food temperature read at block 122 is over a predetermined level and, if it is, a block 126 sets the refrigerator overtemperature flag in the register 68. If the fresh food compartment is not overtemperature, a block 128 resets the refrigerator overtemperature flag in the register 68. The control then continues the status check at block 84.

At block 84, in order to check the status of the freezer cooling, the freezer temperature stored in the register 64 of the RAM 60 is read by a block 130. A block 132 determines whether the freezer temperature as read by block 130 is over a predetermined level and, if it is, a block 134 sets a freezer overtemperature flag in the register 70 of the RAM 60. If it is determined that the freezer compartment is not over temperature, a block 136 resets the freezer overtemperature flag in the register 70 and the program exits to point A to determine whether the one-second check status time interval is up at block 76.

From the above it is seen that the microprocessor control 40 provides a variable door ajar alarm delay wherein an appropriate delay period is determined by the control 40 in response to the status of the monitored operating conditions of the refrigeration apparatus 10. The alarm delay period is set to a decreased value whenever an operating condition reaches a status which is likely to more rapidly produce an undesirable operating temperature within the refrigerator or to produce a temperature condition from which recovery will be unusually slow. It is noted that operating conditions of the refrigerator 10 other than the refrigerator-freezer temperature and defrost operation may be monitored by the door ajar alarm system of the present invention and an appropriate delay period determined by the microprocessor 40 in response thereto.

Figure 5:
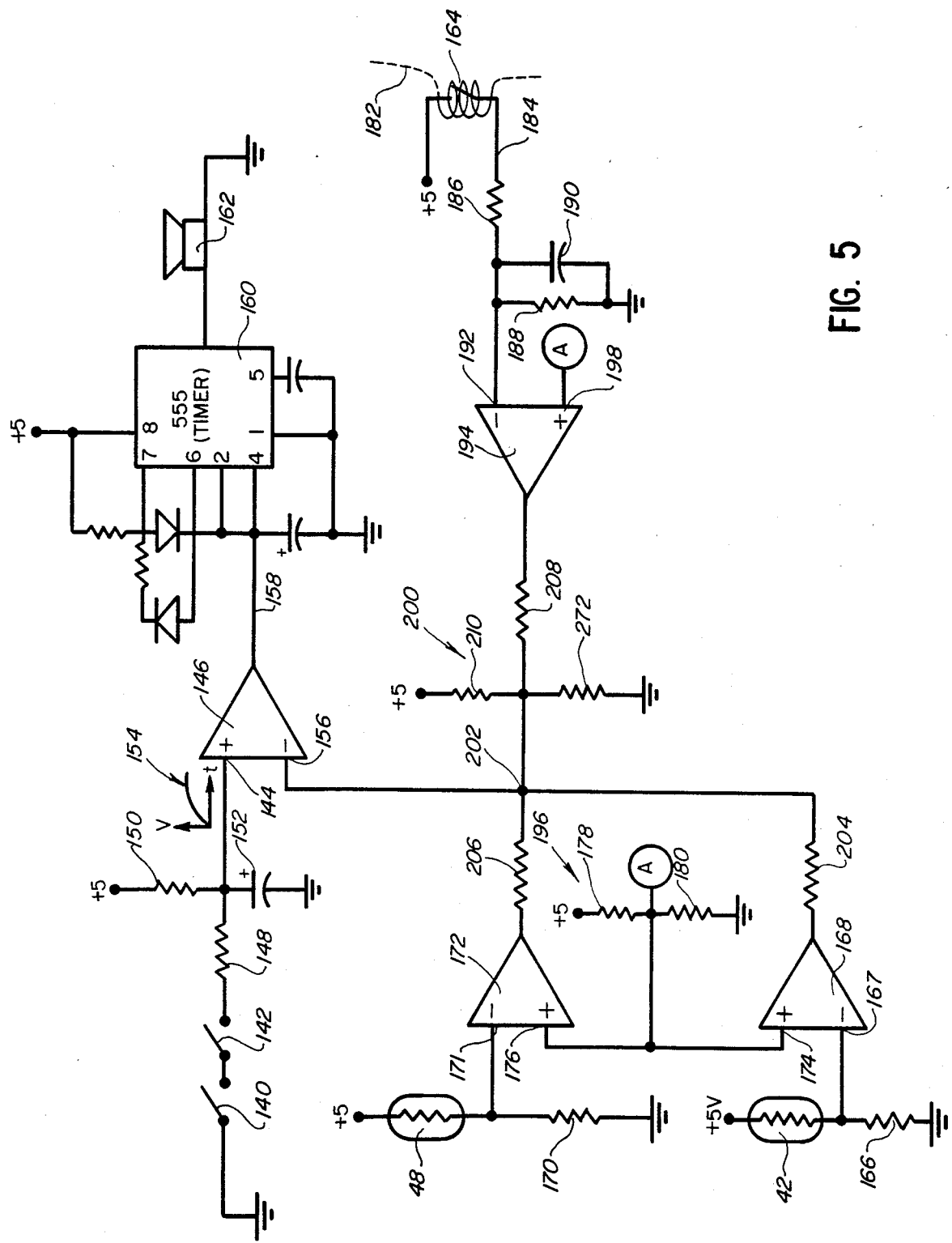
FIG. 5 is a schematic of the control for the analog door ajar alarm system of the present invention.

In a second embodiment of the door ajar alarm system of the present invention, an analog control means is provided, as shown in FIG. 5. The door ajar alarm system includes a pair of normally closed door switches 140 and 142, the switches 140, 142 associated with the freezer door 18 and the fresh food door 20 respectively. The door switches 140 and 142 are coupled to the non-inverting input terminal 144 of a comparator 146 through a 100Ω resistor 148 and a series combination of a 5.1 MΩ resistor 150 and a 50 μf capacitor 152 connected between +5 volts and ground. When one of the door switches 140 or 142 is open, indicating that a refrigerator compartment door 18 or 20 is open, the voltage applied to the terminal 144 of the comparator 146 increases with time during the time that the door is open as illustrated by the graph 154.

The "door open" signal applied to the terminal 144 is compared by the comparator 146 to a reference signal applied to the inverting input terminal 156 thereof. The output of the comparator on a line 158 goes high when the door open signal exceeds the reference signal applied to the terminal 156. A high signal output from the comparator on line 158 triggers a timer 160, which may be a LM 555 timer manufactured by National Semiconductor Corporation. When actuated, the timer 160 energizes a piezoelectric transducer alarm or piezo-alarm 162 to audibly alert the user that the refrigerator door has been opened for a period of time determined by the crossover point of the door open signal and the reference signal.

The reference signal applied to the terminal 156 of the comparator 146 is varied according to the operating conditions of the refrigerator as sensed by the thermistors 42 and 48 and by a reed switch 164 which is responsive to the defrost heater as discussed below. The freezer thermistor 42 is connected between +5 volts and a 90.9 KΩ±1% resistor 166 which is connected to ground, the thermistor 42 also being connected to an inverting input terminal 167 of a comparator 168. The fresh food compartment thermistor 48 is connected between +5 volts and a 40.2 KΩ±1% resistor 170 which is connected to ground, the thermistor 48 also being connected to an inverting input terminal 171 of a comparator 172. The thermistors 42 and 48 are weighted so that the outputs of each may be compared to the same reference signal applied to the noninverting input terminals 174 and 176 of the respective comparators 168 and 172 to cause the output of the comparator 168 to go low when the freezer is overtemperature and to cause the output of the comparator 172 to go low when the fresh food compartment is overtemperature. The reference signal applied to terminals 174 and 176 is provided by a voltage divider comprised of a 100 KΩ resistor 178 and a 100 KΩ resistor 180 connected in series between +5 volts and ground. When the signal applied to the terminal 171 exceeds the signal applied to the terminal 176 the output of the comparator 172 goes low indicating that the fresh food compartment is overtemperature. Similarly, when the signal applied to the terminal 167 exceeds the signal applied to the terminal 174, the output of the comparator 168 goes low, indicating that the freezer compartment is overtemperature.

In order to determine whether the refrigerator 10 is undergoing a defrost operation, the reed switch 164 is provided. The switch 164 closes in response to magnetic flux produced by current flowing through the wire 182 which supplies power to the defrost heater 27, indicating that the defrost heater is on. When the defrost heater is on, the magnetic flux causes the switch 164 to open and close in response to the cycles of the 60 Hz alternating current, producing a pulse train on a line 184 which is applied to a 100Ω resistor 186. The pulse train on line 184 is filtered by a parallel combination of a 100 KΩ resistor 188 and a 0.47 μf capacitor 190 to provide a DC signal which is applied to the inverting input terminal 192 of a comparator 194. The signal applied to the terminal 192 of the comparator 194 is compared to the reference signal generated by the voltage divider 196 which is applied to the noninverting input terminal of the comparator. When the defrost heater is on, the signal on line 192 exceeds the reference signal applied to the terminal 198 causing the output of the comparator 194 to go low.

The variable reference voltage applied to the terminal 156 of the comparator 146 is determined by summation of the outputs of the comparators 168, 172, 194 and a voltage divider 200 at a summing junction 202, the comparators 168, 172 and 194 each being coupled to the junction 202 through a respective 6.8 KΩ resistor 204, 206 and 208. The voltage divider 200 is comprised of an 8.2 KΩ resistor 210 connected in series with a 10 KΩ resistor 212 between +5 volts and ground.

The outputs of each of the comparators 168, 172 and 194 can be viewed as status signals similar to the status signals or flags stored in registers 70, 68 and 72 of the first embodiment.

When none of the monitored operating conditions have reached a predetermined status, the output of each of the comparators 168, 172 and 194 is high. When the high outputs of the comparators are summed with the output of the voltage divider 200, a reference signal is provided which will be exceeded by the open door signal applied to the terminal 144 after an alarm delay period of 180 seconds. If one of the monitored operating conditions reaches a predetermined status such that either the fresh food compartment or freezer compartment is overtemperature or the refrigerator is undergoing a defrost operation, the respective comparator 168, 172 or 194 goes low, decreasing the reference voltage applied to the terminal 156 of the comparator 146. The reference voltage applied to the terminal 156 when only one of the operating conditions has reached its predetermined status is such that the door open signal applied to the terminal 144 exceeds the reference signal after an alarm delay period of 90 seconds. If two of the monitored operating conditions reach their predetermined status, indicated by two of the comparator outputs going low, the reference voltage applied to the terminal 156 of the comparator 146 is such that the open door signal applied to the terminal 144 exceeds the reference signal after an alarm delay period of 60 seconds. If all three of the monitored operating conditions have reached their predetermined status, indicated by low outputs from all three of the comparators 168, 172 and 194, the voltage divider 200 establishes the reference voltage applied to the terminal 156, the reference voltage being such that the door open signal exceeds the reference signal after an alarm delay period of 45 seconds.

The door ajar alarm system of the present invention having a variable alarm delay period provides an adequate warning for the user under various operating conditions of the refrigerator. The alarm delay period for the system is set to successively shorter periods of time for each operating condition which reaches a predetermined status so that the alarm is always actuated before undesirable temperature conditions are reached.

Having described the invention, the embodiments of the invention in which an exclusive property or privilege is claimed are defined as follows:

1. In a refrigeration apparatus having means defining a refrigerated compartment and a door for providing access to said compartment, an improved door ajar alarm comprising:
   means for sensing when said door is open;
   means for sensing an operating condition of said refrigeration apparatus other than the position of said door;
   means for providing an alarm; and
   control means coupled to said door sensing means, said condition sensing means and said alarm means for actuating said alarm means in response to said door being open for a period of time which varies in accordance with the sensed operating condition of the refrigeration apparatus.

2. The refrigeration apparatus of claim 1 wherein said control means includes means for monitoring a plurality of operating conditions and providing an indication when a monitored condition reaches a predetermined status, said control means being responsive to each such indication for determining a door open period which must elapse before said control means actuates said alarm means.

3. The refrigeration apparatus of claim 2 wherein said control means determines a successively shorter period of time for which the door is to be open in response to each indication that a sensed condition has reached a predetermined status.

4. In a refrigeration apparatus having means defining a refrigerated compartment and a door for providing access to said compartment, an improved door ajar alarm comprising:
   means for sensing when said door is open;
   a plurality of sensors, each sensor coupled to the refrigeration apparatus to sense a different operating condition of the apparatus and to provide a signal representing the sensed condition;
   means for providing an alarm; and
   control means coupled to said door sensing means, each of said condition sensors and said alarm means for actuating said alarm means when said door has been open for a period of time, said control means including means responsive to each of said condition sensor signals for indicating the status of the sensed conditions to provide a corresponding status signal when a sensed condition reaches a predetermined status, and means responsive to said status signals for determining the period of door open time after which said alarm means is actuated, said period of door open time being varied thereby in accordance with the sensed conditions of the refrigeration apparatus.

5. The refrigeration apparatus of claim 4 wherein said determining means varies the door open period in accordance with the number of status signals provided.

6. The refrigeration apparatus of claim 4 wherein said determining means selects successively shorter periods of door open time in response to each status signal provided.

7. The refrigeration apparatus of claim 4 wherein said control means comprises a microprocessor control and includes means for storing said status signals and the determined period of door open time.

8. The refrigeration apparatus of claim 7 wherein said determining means varies said period of door open time only when the door is not open, such that the control means actuates the alarm means when the door has been open for a period of door open time previously determined and stored by the control means.

9. The refrigeration apparatus of claim 7 wherein said control means checks the status of each sensed condition at frequent, periodic intervals.

10. The refrigeration apparatus of claim 4 wherein at least one of the sensors is coupled to the refrigeration apparatus to sense the temperature within the refrigerated compartment, said indicating means providing a status signal when the sensed temperature is greater than a reference temperature.

11. The refrigeration apparatus of claim 4 including a defrost heater, wherein one of said sensors is coupled to the refrigeration apparatus to sense whether the defrost heater is on or off, said indicating means providing a status signal when the defrost heater is on.

12. In a refrigeration apparatus having means defining a refrigerated compartment and a door for providing access to said compartment, an improved door ajar alarm comprising:

means for sensing when said door is open to provide a signal which increases with time when the door is open;

means for sensing the status of a plurality of operating conditions of the refrigeration apparatus;

means coupled to said sensing means for providing a first reference signal which varies in response to the status of each operating condition sensed by the condition sensing means;

means for comparing said door open signal to said reference signal to provide a trigger signal when the door open signal exceeds the reference signal; and means for providing an alarm in response to said trigger signal.

13. The refrigeration apparatus of claim 12 wherein said means for providing said reference signal decreases said first reference signal for each sensed operating condition that reaches a predetermined status, to thereby decrease the time it takes the door open signal to exceed the first reference signal.

14. The refrigeration apparatus of claim 12 wherein said sensing means includes a plurality of sensors, each sensor coupled to the refrigeration apparatus to sense a different operating condition of the apparatus and to provide a signal representing the sensed condition, and said means for providing said first reference signal includes a plurality of comparators, each comparator coupled to a different sensor for comparing the condition signal provided by the sensor to a condition reference signal to provide a status signal which indicates the existence of a predetermined operating condition.

15. The refrigeration apparatus of claim 14 further including means for summing the status signal outputs of each of said comparators to provide said first reference signal.

16. The refrigeration apparatus of claim 14 wherein one of said sensors is coupled to the refrigeration apparatus to sense the temperature of the refrigerated compartment.

17. The refrigeration apparatus of claim 14 including a defrost heater, wherein one of said sensors is coupled to said defrost heater to sense whether the defrost heater is on or off.

18. In a refrigeration apparatus having means defining an above-freezing compartment, a below-freezing compartment, a door for providing access to said above-freezing compartment, a door for providing access to said below-freezing compartment, and an evaporator having defrost heater, an improved door ajar alarm, comprising:

a temperature sensor arranged to sense the temperature within one of said compartments;

a defrost sensor arranged to indicate the energization of said defrost heater;

a first door switch arranged to indicate when said above-freezing compartment door is open;

a second door switch arranged to indicate when said below-freezing compartment door is open;

an electrically energizable alarm device for producing an audible alarm signal; and a microprocessor-based control for controlling the energization of said alarm device, comprising:

means for monitoring said temperature sensor and said defrost sensor and storing signals indicating whether the sensed temperature is above a predetermined temperature and when the defrost heater is energized, respectively;

means for establishing a stored count having a value which is determined by said stored temperature signal and said stored defrost signal;

means responsive to said first and second door switches and operative whenever either of said doors has been opened for terminating the operation of said count establishing means, and thereafter periodically changing of the value of said stored count; and, means for energizing said alarm device when said stored count has been changed to a predetermined value.

* * * * *